(12) United States Patent
Yu et al.

(10) Patent No.: US 12,310,490 B2
(45) Date of Patent: May 27, 2025

(54) INTERDENTAL BRUSH AND MANUFACTURING METHOD FOR THE SAME

(71) Applicant: LG HOUSEHOLD & HEALTH CARE LTD., Seoul (KR)

(72) Inventors: Hye Ju Yu, Seoul (KR); Kyung Sub Lee, Seoul (KR); Wan Sik Jang, Seoul (KR)

(73) Assignee: LG HOUSEHOLD & HEALTH CARE LTD., Seoul (KR)

( * ) Notice: Subject to any disclaimer, the term of this patent is extended or adjusted under 35 U.S.C. 154(b) by 333 days.

(21) Appl. No.: 17/943,855

(22) Filed: Sep. 13, 2022

(65) Prior Publication Data
US 2023/0082568 A1  Mar. 16, 2023

(30) Foreign Application Priority Data

Sep. 14, 2021 (KR) .................. 10-2021-0122799
Sep. 14, 2021 (KR) .................. 10-2021-0122800

(51) Int. Cl.
*A46B 5/02* (2006.01)
*A46D 3/00* (2006.01)
*A61C 15/00* (2006.01)

(52) U.S. Cl.
CPC .............. *A46B 5/026* (2013.01); *A46D 3/005* (2013.01); *A61C 15/00* (2013.01); *A46B 2200/108* (2013.01)

(58) Field of Classification Search
CPC ..... A46B 9/005; A46B 5/026; A46B 15/0069; A46B 2200/108; A61C 15/02; A61C 15/00
See application file for complete search history.

(56) References Cited

U.S. PATENT DOCUMENTS

| | | |
|---|---|---|
| 9,603,685 B2 | 3/2017 | Eatherton |
| 9,642,682 B2 | 5/2017 | Kato |
| 10,299,577 B2 | 5/2019 | Schär et al. |
| 10,500,774 B2 | 12/2019 | Gengyo et al. |
| 10,779,918 B2 | 9/2020 | Kato et al. |
| 10,779,919 B2 | 9/2020 | Kato et al. |

(Continued)

FOREIGN PATENT DOCUMENTS

| | | |
|---|---|---|
| CN | 211269097 U | 8/2020 |
| EP | 2 857 167 A1 | 4/2015 |

(Continued)

*Primary Examiner* — Shay Karls
(74) *Attorney, Agent, or Firm* — Birch, Stewart, Kolasch & Birch, LLP

(57) ABSTRACT

An interdental brush of the present disclosure includes a base part including a handle part that is grippable by a user, and a core part extending from the handle part and having a diameter or thickness that decreases as a distance from the handle part increases, and a soft part including an anti-slip part covering at least a part of the handle part, and an interdental cleaning part covering the core part and including a plurality of projections for removing foreign substances between teeth, the soft part being formed of an elastic material. The base part includes a plurality of through holes disposed to be spaced apart from each other in a longitudinal direction, and the soft part is provided in a space formed by at least one of the plurality of through holes.

14 Claims, 21 Drawing Sheets

(56) References Cited

U.S. PATENT DOCUMENTS

| | | |
|---|---|---|
| 10,786,337 B2 | 9/2020 | Kato et al. |
| 2016/0058531 A1 | 3/2016 | Adriano et al. |
| 2017/0189148 A1 | 7/2017 | Kato |
| 2017/0319309 A1 | 11/2017 | Gengyo et al. |
| 2018/0256298 A1 | 9/2018 | Kikkawa et al. |
| 2018/0263741 A1 | 9/2018 | Kikkawa |
| 2019/0000598 A1 | 1/2019 | Kikkawa et al. |
| 2019/0246778 A1 | 8/2019 | Schär et al. |
| 2019/0343608 A1 | 11/2019 | Kikkawa et al. |
| 2021/0267732 A1 | 9/2021 | Kikkawa et al. |
| 2021/0289934 A1 | 9/2021 | Kikkawa |
| 2022/0047365 A1 | 2/2022 | Kikkawa et al. |
| 2022/0063155 A1 | 3/2022 | Kikkawa |
| 2022/0087796 A1 | 3/2022 | Kikkawa |
| 2022/0117385 A1 | 4/2022 | Kikkawa et al. |

FOREIGN PATENT DOCUMENTS

| | | | |
|---|---|---|---|
| EP | 2 829 253 B1 | 10/2016 | |
| EP | 3 219 291 A1 | 9/2017 | |
| EP | 3 305 241 A1 | 4/2018 | |
| EP | 3 305 242 A1 | 4/2018 | |
| EP | 3 305 243 A1 | 4/2018 | |
| EP | 3 245 977 B1 | 7/2019 | |
| EP | 3 342 371 B1 | 11/2020 | |
| JP | 8-228840 A | 9/1996 | |
| JP | 5929346 B2 | 6/2016 | |
| JP | 2016-521159 A | 7/2016 | |
| JP | 6060505 B2 | 1/2017 | |
| JP | 2017-119095 A | 7/2017 | |
| JP | 6281586 B2 | 2/2018 | |
| JP | 6311796 B2 | 4/2018 | |
| JP | 2018-140088 A | 9/2018 | |
| JP | 6409825 B2 | 10/2018 | |
| JP | 2019-118516 A | 7/2019 | |
| JP | 6565929 B2 | 8/2019 | |
| JP | 2019-188017 A | 10/2019 | |
| JP | 6594247 B2 | 10/2019 | |
| JP | 2019188013 A * | 10/2019 | ............... A46B 1/00 |
| JP | 2020-752 A | 1/2020 | |
| JP | 2020-753 A | 1/2020 | |
| JP | 2020-103848 A | 7/2020 | |
| JP | 2020-103849 A | 7/2020 | |
| JP | 2020-103850 A | 7/2020 | |
| JP | 2020-103851 A | 7/2020 | |
| JP | 2020-103852 A | 7/2020 | |
| JP | 6750329 B2 | 9/2020 | |
| JP | 6812124 B2 | 1/2021 | |
| JP | 6822776 B2 | 1/2021 | |
| KR | 20-0331547 Y1 | 11/2003 | |
| KR | 20-0438714 Y1 | 3/2008 | |
| KR | 20-0472006 Y1 | 4/2014 | |
| KR | 10-2016-0002905 A | 1/2016 | |
| KR | 10-2016-0130426 A | 11/2016 | |
| KR | 10-2018-0036642 A | 4/2018 | |
| WO | WO-2016076373 A1 * | 5/2016 | ......... A46B 15/0093 |
| WO | WO-2019057516 A1 * | 3/2019 | ............... A46B 1/00 |

* cited by examiner

INTERDENTAL BRUSH AND MANUFACTURING METHOD FOR THE SAME

CROSS-REFERENCE TO RELATED APPLICATION

The present application claims priority under 35 U.S.C. § 119(a) to Korean patent application number 10-2021-0122800 filed on Sep. 14, 2021 and Korean patent application number 10-2021-0122799 filed on Sep. 14, 2021, in the Korean Intellectual Property Office, the entire disclosure of which is incorporated by reference herein.

BACKGROUND

1. Technical Field

The present disclosure relates to an interdental brush and a method of manufacturing the same.

2. Related Art

After eating food, foreign substances, which are difficult to clean with a regular brush, may be interposed between the teeth. In order to remove these foreign substances, a toothpick or an interdental brush may be used to remove the foreign substances between the teeth. Therefore, the toothpick and the interdental brush may be used to prevent tooth decay and periodontal disease.

The toothpick may be made of wood, plastic, and starch, and may be used to remove food debris between teeth. At this time, when the gap between the teeth is narrow, the end of the sharp toothpick does not fit well between the teeth so that food debris is not easily removed, and the hard and sharp end may be easily broken, which may give inconvenience to a user.

In order to solve this issue, an interdental brush equipped with a brush has been manufactured and used. The interdental brush may remove food debris through the movement of the brush entering and exiting the gap between the teeth and rubbing between the teeth.

SUMMARY

The present disclosure has been made in an effort to solve the issues of the related art as described above. Embodiments provide an interdental brush that can be easily gripped by a user and can effectively remove foreign substances between the teeth and a method of manufacturing the same.

In accordance with an aspect of the present disclosure, there is provided an interdental brush including: a base part including a handle part that is grippable by a user, and a core part extending from the handle part and having a diameter or thickness that decreases as a distance from the handle part increases; and a soft part including an anti-slip part covering at least a part of the handle part, and an interdental cleaning part covering the core part and including a plurality of projections for removing foreign substances between teeth, the soft part being formed of an elastic material, wherein the base part includes a plurality of through holes disposed to be spaced apart from each other in a longitudinal direction, and the soft part is provided in a space formed by at least one of the plurality of through holes.

The base part may include a first through hole and a second through hole provided to be spaced apart from each other in the handle part, and the second through hole may be disposed between the core part and the first through hole.

Specifically, a width of the first through hole may be 35% to 90% of a width of the handle part corresponding to the first through hole in a direction perpendicular to a longitudinal direction of the handle part.

Specifically, the soft part may be provided in a space formed by the second through hole.

Specifically, the base part may include a concave part disposed between a lower end of the handle part and the core part, having a shape extending to a periphery of the first through hole, and having a smaller thickness than other regions, a groove part connected to an upper end of the concave part and having a shape extending to the core part, and a third through hole provided in a part of the groove part, the anti-slip part may be provided corresponding to the concave part, and the interdental cleaning part may be provided in a form to surround the core part in correspondence with the core part.

Specifically, the soft part may further include a connection part provided corresponding to the groove part and configured to connect the anti-slip part and the interdental cleaning part, and the connection part may be provided in the third through hole.

Specifically, the anti-slip part may be provided on a surface of a region corresponding to the second through hole, and may include a plurality of protruding projections extending in a direction parallel to an extension direction of the handle part.

Specifically, the interdental cleaning part may further include a plurality of continuous projections provided to be spaced apart from each other on an outer circumferential surface of the core part and extending parallel to an extension direction of the core part, the plurality of continuous projections may extend parallel to the extension direction of the core part, or have a spiral shape surrounding the outer circumferential surface of the core part, the plurality of continuous projections may include a plurality of protrusions provided on the plurality of continuous projections to be spaced apart from each other, and projection heads provided on the plurality of protrusions, the core part may include a groove extension part connected to the groove part, and a part of the plurality of the continuous projections may be provided in the groove extension part.

Specifically, a surface of the core part exposed between the plurality of continuous projections may have a high surface roughness or further include fine projections.

Specifically, a cross-section of the core part may have a triangular shape, and a core projection is provided at a corner part of a triangle, the core projection may have a shape of protruding to outside of the circle formed by the core part and the plurality of continuous projections, the core projection and the plurality of continuous projections may have a spiral shape of surrounding the outer circumferential surface of the core part, and the core part may have a shape in which each side of the triangle is curved toward a center of the core part.

Specifically, the interdental cleaning part may further include a projection connection part provided at an end of the interdental cleaning part to connect the plurality of continuous projections.

In accordance with another aspect of the present disclosure, there is provided a method of manufacturing an interdental brush including: forming a base part including a handle part that is grippable by a user and a core part extending from the handle part and having a diameter or thickness that decreases as a distance from the handle part increases, by injecting a synthetic resin material into a first mold having a first internal space; preparing a second mold having a second internal space, the base part being disposed in the second internal space; and forming a soft part including an anti-slip part covering at least a part of the handle part, and an interdental cleaning part covering the core part and including a plurality of projections for removing foreign substances between teeth, and the soft part being formed of an elastic material, by injecting an elastic material into the second mold, wherein the base part includes a concave part disposed between a lower end of the handle part and the core part, and having a smaller thickness than other regions, and a groove part connected to an upper end of the concave part and having a shape extending to the core part, the second mold includes a gate into which the elastic material is injected, and the gate is provided corresponding to the groove part.

Specifically, the gate may be provided at a position where volumes of spaces of both sides of the gate in which the soft part is formed are substantially the same.

Specifically, the base part may include a first through hole and a second through hole provided in the handle part and spaced apart from each other and a third through hole provided in a part of the groove part, the second through hole may be disposed between the core part and the first through hole, and the soft part may be provided in a space formed by the second through hole and the third through hole.

Specifically, the soft part further include a connection part provided corresponding to the groove part and configured to connect the anti-slip part and the interdental cleaning part, the anti-slip part may be provided corresponding to the concave part, and the interdental cleaning part may be provided in a form of surrounding the core part in correspondence with the core part.

In accordance with another aspect of the present disclosure, there is provided an interdental brush including: a base part including a core part, a diameter or a thickness of the core part decreasing from one end of both ends to the other end; and a soft part including an interdental cleaning part covering the core part and including a plurality of projections for removing foreign substances between teeth, the soft part being formed of an elastic material, wherein the interdental cleaning part includes a plurality of continuous projections provided to be spaced apart from each other on an outer circumferential surface of the core part and extending parallel to an extension direction of the core part.

Specifically, the plurality of continuous projections may have a spiral or linear shape surrounding the outer circumferential surface of the core part.

Specifically, a cross-section of the core part may have a triangular shape, and a core projection may be provided at a corner part of a triangle.

Specifically, the core projection may protrude to outside of the circle formed by the core part and the plurality of continuous projections.

Specifically, the interdental cleaning part may further include a projection connection part provided at an end of the interdental cleaning part to connect the plurality of continuous projections.

An interdental brush according to example embodiments of the present disclosure may be easily gripped by the user because the handle part and the interdental cleaning part are bent at a predetermined angle, and may effectively remove the foreign substances between the teeth.

In addition, according to example embodiments of the present disclosure, it is possible to improve injection moldability of the interdental brush because flow of the soft part material is improved by the through hole present in the base part.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The objects, specific advantages, and novel features of the present disclosure will become more apparent from the following detailed description and preferred embodiments taken in conjunction with the accompanying drawings. In the present specification, in adding reference numbers to the components of each drawing, it should be noted that only the same components are given the same number as possible even though they are indicated on different drawings. In addition, in describing the present invention, if it is determined that a detailed description of a related known technology may unnecessarily obscure the gist of the present invention, the detailed description thereof will be omitted.

Hereinafter, preferred embodiments of the present disclosure will be described in detail with reference to the accompanying drawings.

Figure 1:
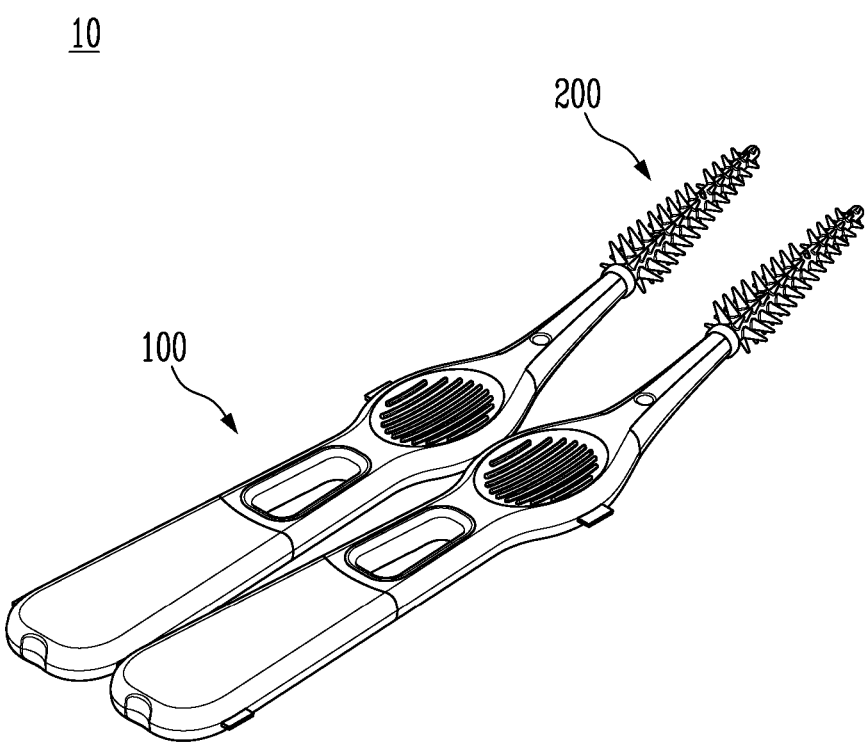
FIG. 1 is a perspective view for illustrating an interdental brush in accordance with an embodiment of the present disclosure.
Figure 2:
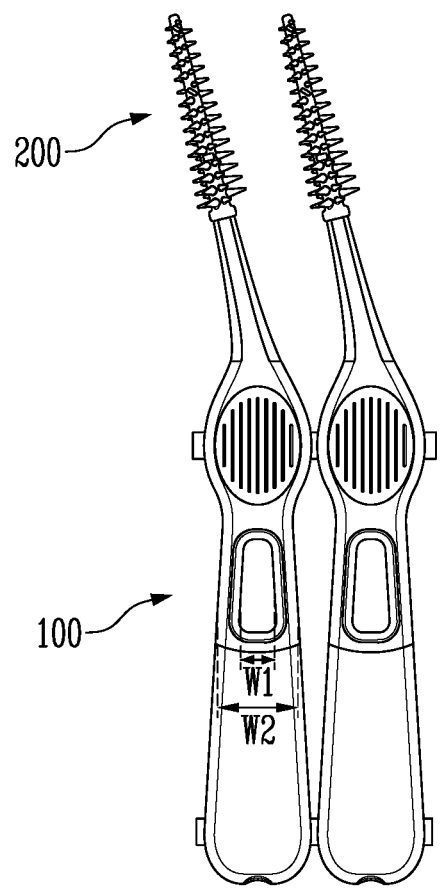
FIG. 2 is a plan view for illustrating the interdental brush shown in FIG. 1.
Figure 3:
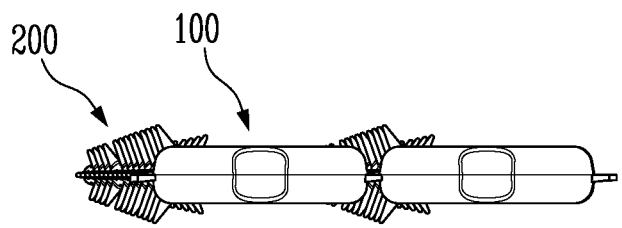
FIG. 3 is a rear view for illustrating the interdental brush shown in FIG. 1.
Figure 4:
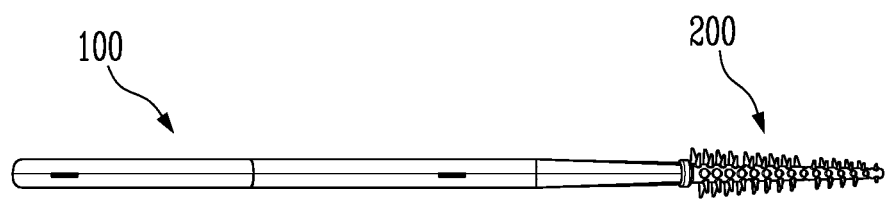
FIG. 4 is a side view for illustrating the interdental brush shown in FIG. 1.
Figure 5:
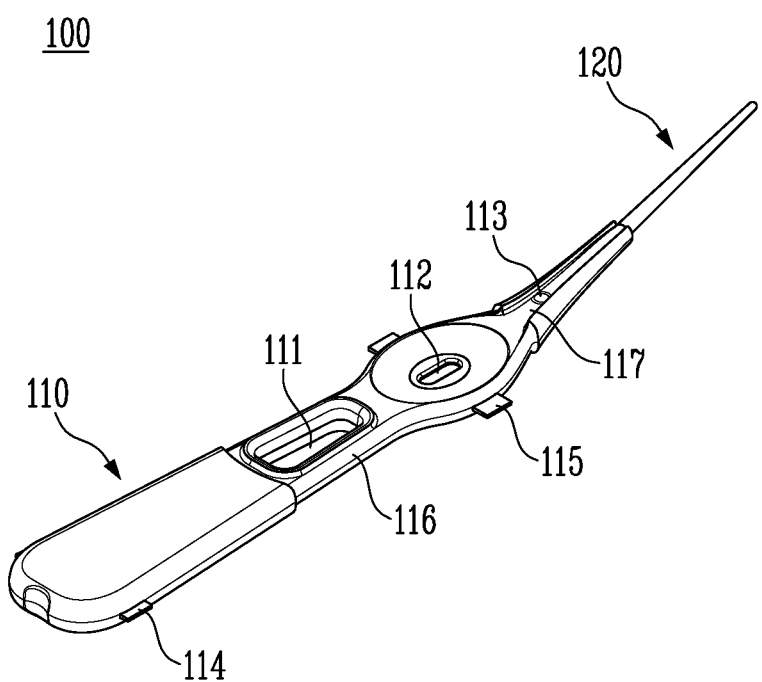
FIG. 5 is a perspective view for illustrating a base part of the interdental brush shown in FIG. 1.
Figure 6:
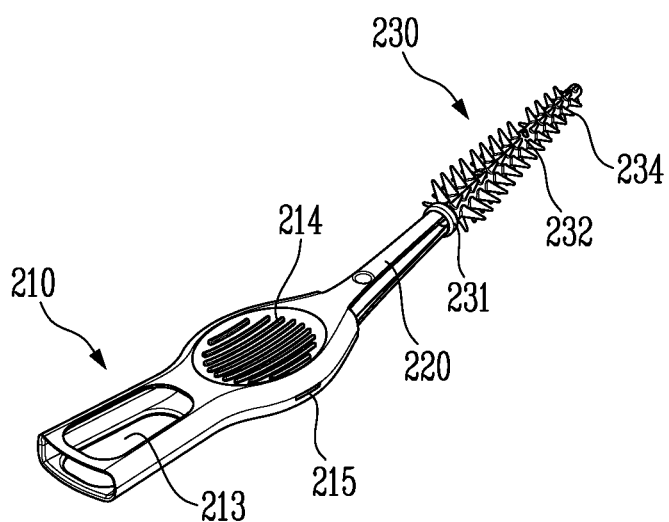
FIG. 6 is a perspective view for illustrating a soft part of the interdental brush shown in FIG. 1.
Figure 7:
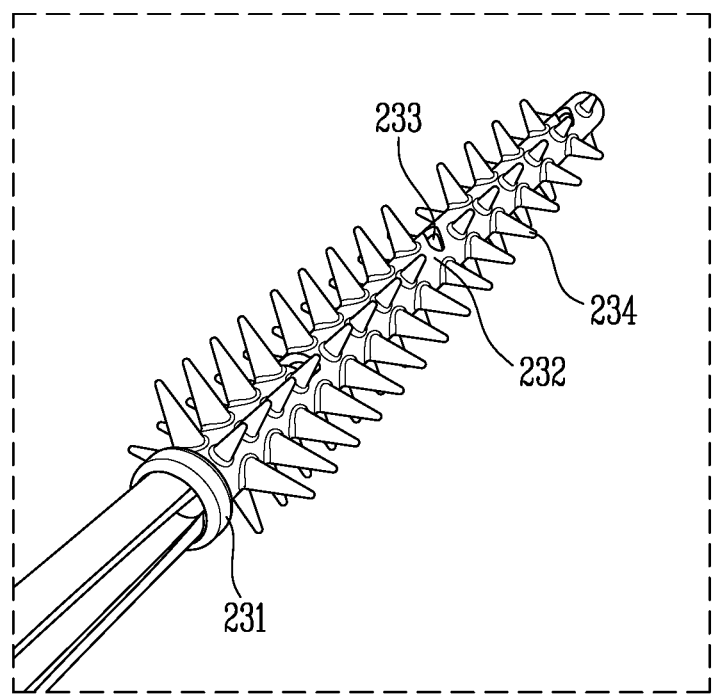
FIG. 7 is an enlarged view of a part of the soft part shown in FIG. 6.
Figure 8:
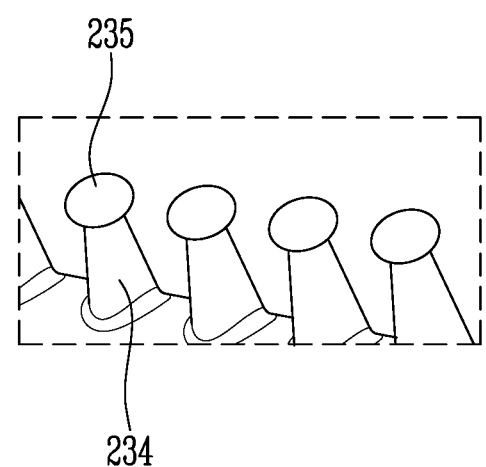
FIG. 8 is a cross-sectional view for illustrating projections and projection heads.

FIG. 1 is a perspective view for illustrating an interdental brush in accordance with an embodiment of the present disclosure, FIG. 2 is a plan view for illustrating the interdental brush shown in FIG. 1, FIG. 3 is a rear view for illustrating the interdental brush shown in FIG. 1, FIG. 4 is a side view for illustrating the interdental brush shown in FIG. 1, FIG. 5 is a perspective view for illustrating a base part of the interdental brush shown in FIG. 1, FIG. 6 is a perspective view for illustrating a soft part of the interdental brush shown in FIG. 1, FIG. 7 is a partially enlarged view of the soft part shown in FIG. 6, and FIG. 8 is a cross-sectional view for illustrating projections and projection heads.

Referring to FIG. 1 to FIG. 8, an interdental brush 10 according to an embodiment of the present disclosure may be used to remove foreign substances interposed between a user's teeth.

The interdental brush 10 may include a base part 100 and a soft part 200.

The base part 100 may be formed of a synthetic resin material, and may have higher rigidity than the soft part 200. For example, the base part 100 may be formed of a thermoplastic synthetic resin such as polypropylene (PP), polybutylene terephthalate (PBT), polyethylene, polyethylene terephthalate, polycyclohexene dimethylene terephthalate, saturated polyester resin, polymethyl methacrylate, cellulose propionic acid, polyurethane, polyamide, polycarbonate, or acrylonitrile butadiene styrene (ABS). Here, when the base part 100 may be formed of PP, PBT, or polyamide, elastic recovery may be possible during deformation such as folding of the base part 100. In particular, the polypropylene may be a suitable material for the base part 100 because the polypropylene has a low molding temperature, can shorten cycle time, and can improve productivity, and at the same time, applies a low thermal load on molding equipment.

In addition, the base part 100 may include a synthetic resin and a fiber material such as glass fiber, carbon fiber, or aramid fiber dispersed in the synthetic resin. When the fiber material is included in the synthetic resin, the dimensional stability of the base part 100 may be improved and, at the same time, the strength and rigidity of the base part 100 may be increased to prevent deformation. In addition, when the fiber material is included in the synthetic resin, since the thermal deformation temperature of the base part 100 increases, it may be effectively prevented that the base part 100 is softened and deformed by the heat of the elastic material when the soft part 200 is molded. In addition, since the rigidity of the base part 100 is also increased by the fiber material, deformation of the base part 100 due to the injection pressure of the elastic material and molding defects of the soft part 200 may be effectively prevented.

The base part 100 may include a handle part 110 and a core part 120.

The handle part 110 may be a part that the user of the interdental brush 10 can grip, and may have a flat rod shape. For example, the handle part 110 may have a thin plate shape.

The handle part 110 may be formed in the flat rod shape that is gently curved, but is not limited thereto. The handle part 110 may be formed in any shape that is easy for the user to grip and clean between teeth.

The size of the handle part 110 may be set to any size as long as it is easy for the user to grip and clean the interdental space.

A plurality of through holes 111 and 112 may be provided in the handle part 110. For example, the first through hole 111 and the second through hole 112 disposed to be spaced apart from each other in the longitudinal direction of the handle part 110 may be provided in the handle part 110. Here, the second through hole 112 may be disposed adjacent to the core part 120 compared to the first through hole 111. In other words, the second through hole 112 may be disposed between the first through hole 111 and the core part 120. By the first through hole 111 and the second through hole 112, the user may more easily grip the handle part 110.

Connecting projections 114 and 115 may be provided on the side of the handle part 110. The connecting projections 114 and 115 may connect the handle parts 110 adjacent to each other, and may be integrally formed with the base part 100. Accordingly, a plurality of base parts 100 may be connected through the connecting projections 114 and 115 and arranged in parallel.

The connecting projections 114 and 115 may include a first connecting projections 114 connecting the lower ends of the handle parts 110 adjacent to each other and a second connecting projection 115 connecting the upper ends of the handle parts 110 adjacent to each other, in other words, connecting regions adjacent to the core part of the handle parts 110 adjacent each other.

The first connecting projection 114 and the second connecting projection 115 may be formed in a thin shape, and may be cut by the user. The user may use the one interdental brush 10 separately by cutting the first connecting projection 114 and the second connecting projection 115.

A concave part 116 and a groove part 117 may be provided in the handle part 110. The concave part 116 and the groove part 117 may be connected to each other.

The concave part 116 may be a region having a smaller thickness than the thickness of other regions of the handle part 110 and may be disposed between the lower end of the handle part 110 and the core part 120. For example, the concave part 116 may have a shape that is connected to the groove part 117 and extends to the periphery of the first through hole 111. A part of the soft part 200 may be provided in the concave part 116, and the height of the surface of the soft part 200 provided in the concave part 116 may be substantially the same as the height of the surface of the other region of the base part 100.

On the other hand, in the direction perpendicular to the longitudinal direction of the handle part 110, a width W1 of the first through hole 111 may be shorter than a width W2 of the handle part 110 corresponding to the first through hole 111. In particular, the width W1 of the first through hole 111 may be 35% to 90% of the width W2 of the handle part 110.

In addition, the second through hole 112 may increase flowability of the material forming the soft part 200 to improve the moldability of the interdental brush 10 according to the present embodiment. In order to increase the flowability of the material forming the soft part 200, the second through hole 112 may have an area of 0.8 mm 2 or more.

The groove part 117 may be connected to a part of an upper end of the concave part 116, and may have a shape extending from the concave part 116 to the core part 120. A part of the soft part 200 may be provided in the groove part 117, and the height of the surface of the soft part 200 provided in the groove part 117 may be substantially the same as the height of the surface of the soft part 200 provided in the concave part 116 of the base part 100.

In addition, a third through hole 113 may be provided in a part of the groove part 117. In other words, the plurality of through holes 111, 112, and 113 may be disposed to be spaced apart from each other in the longitudinal direction of the base part 100.

The core part 120 may extend from the handle part 110 and may be formed in a substantially linear and elongated shaft shape. The core part 120 may be formed in a gently tapered shape in which the diameter or thickness decreases toward the front side, in other words, the farther away from the handle part 110. However, the angle formed by the taper shape of the core part 120 may be set to the same angle over the entire length of the core part 120, and may be set to decrease continuously or stepwise toward the front side of the core part 120.

The soft part 200 may be formed of an elastic material. For example, the soft part 200 may be formed of a thermoplastic elastic material such as styrene-based, olefin-based, polyamide-based, or the like, or a thermosetting elastic material such as silicone rubber, urethane rubber, fluoro rubber, natural rubber, or synthetic rubber. In particular, the soft part 200 may be formed of a material having compatibility with the synthetic resin material forming the base part 100. For example, when the base part 100 is formed of polypropylene, the soft part 200 may be formed of a polyolefin-based elastic material or a styrene-based elastic material.

The soft part 200 may be provided in the form of a covering which extends from a part of the base part 100 to surround the core part 120. The soft part 200 may include an anti-slip part 210, a connection part 220, and an interdental cleaning part 230.

The anti-slip part 210 may cover at least a part of the handle part 110. The anti-slip part 210 may be provided corresponding to the concave part 116. The anti-slip part 210 may prevent the interdental brush 10 from sliding out of the user's hand when the user grips the interdental brush 10.

The anti-slip part 210 may include an opening 213 provided in a region corresponding to the first through hole 111 so that the user may fix the interdental brush 10 with fingers.

The anti-slip part 210 may be provided in a space formed by the second through hole 112. Since the anti-slip part 210 is provided in the space formed by the second through hole 112, separation of the base part 100 and the soft part 200 may be prevented.

The anti-slip part 210 may prevent the interdental brush 10 from sliding out of the user's hand by including a protruding projection 214 provided on the surface of the region corresponding to the second through hole 112. Here, a plurality of the protruding projections 214 may be provided, and may have a shape extending in a direction parallel to the extension direction of the handle part 110.

In addition, an exposure hole 215 through which the second connecting projection 115 is exposed may be provided in a part of the anti-slip part 210.

The connection part 220 may be provided in a region corresponding to the groove part 117. The connection part 220 may connect the anti-slip part 210 and the interdental cleaning part 230.

The connection part 220 may be provided in a space formed by the third through hole 113. In other words, separation of the base part 100 and the soft part 200 may be prevented as the connection part 220 is provided in the space formed by the third through hole 113.

The interdental cleaning part 230 may be provided corresponding to the core part 120, and may be provided to surround the core part 120. The interdental cleaning part 230 may clean the user's interdental space. The interdental cleaning part 230 may be connected to the anti-slip part 210 through the connection part 220. In other words, the anti-slip part 210, the connection part 220, and the interdental cleaning part 230 may be provided integrally.

The interdental cleaning part 230 may include an insertion preventing part 231, a covering part 232, and a projection 234.

The insertion preventing part 231 may prevent a part of the handle part 110 other than the interdental cleaning part 230 from being inserted into the user's interdental space when the user cleans the interdental space. To this end, the height of the surface of the insertion prevention part 231 may be higher than the height of the surface of the anti-slip part 210, the connection part 220, and the covering part 232.

The covering part 232 may be provided to cover the core part 120. A through hole 233 may be provided in a part of the covering part 232, and the through hole 233 may be provided in the covering part 232 in plurality. Also, the through hole 233 may expose a part of the core part 120.

The projection 234 may be inserted into the user's interdental space together with the covering part 232 to remove foreign substances between the teeth. The projection 234 may have a shape protruding from the surface of the covering part 232 and may be provided in plurality.

The projection 234 may have a shape in which the diameter or thickness decreases as the distance from the covering part 232 increases. For example, the projection 234 may have a conical shape or a polygonal pyramid shape. Meanwhile, in the present embodiment, it has been described that the projection 234 has the conical shape or the polygonal pyramid shape as an example, but is not limited thereto. For example, the projection 234 may have an elliptical cross-sectional shape, and the length of the major axis and the minor axis of the ellipse may decrease as the distance from the covering part 232 increases.

In addition, a protrusion length and a diameter of the projection 234 disposed adjacent to the handle part 110 may be greater than the protrusion length and the diameter of the projection 234 disposed to be spaced apart from the handle part 110.

The projections 234 may be arranged in various shapes. For example, the projections 234 may be regularly or irregularly arranged with a predetermined interval therebetween. In particular, the projections 234 may extend parallel to the extension direction of the core part 120 and may be alternately disposed on imaginary lines adjacent to each other.

A projection head 235 may be provided at an upper end of the projection 234. The projection head 235 may have various shapes. For example, the projection head 235 may have a spherical shape, an ellipsoid shape, or a polyhedral shape. However, the projection head 235 may have a diameter or thickness greater than the diameter or thickness of the upper end of the projection 234.

When the interdental brush 10 reciprocates to remove the foreign substances between the teeth, the projection head 235 may effectively remove the foreign substances between the teeth.

The interdental brush 10 as described above may include the first through hole 111 so that the user may more easily grip the interdental brush 10. The interdental brush 10 may prevent the soft part 200 from being separated from the base part 100 as a part of the soft part 200 is provided in the space formed by the second through hole 112. In addition, the interdental brush 10 may more effectively remove the interdental foreign substances through the projection head 235.

Figure 9:
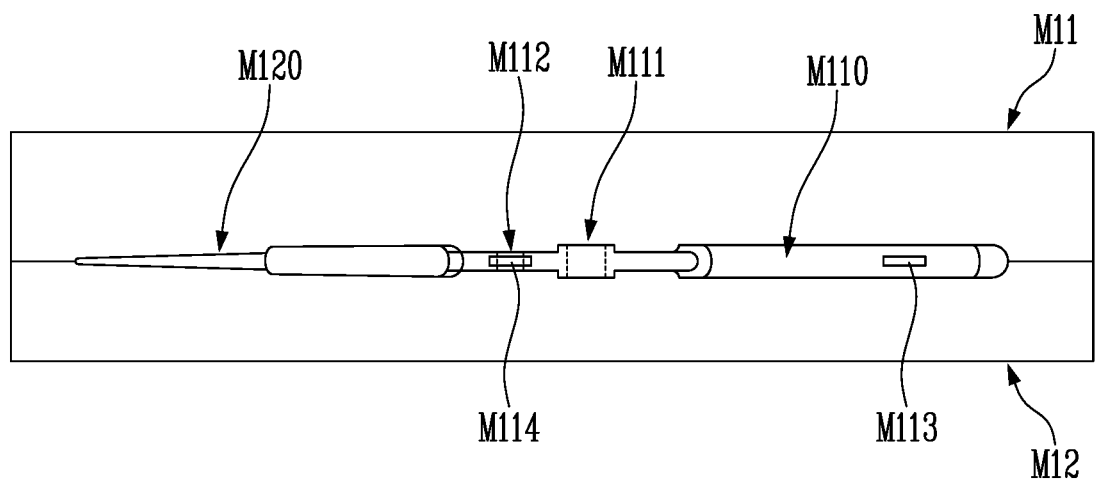
FIG. 9 is a cross-sectional view for illustrating a method of manufacturing the base part shown in FIG. 1 to FIG. 8.
Figure 10:
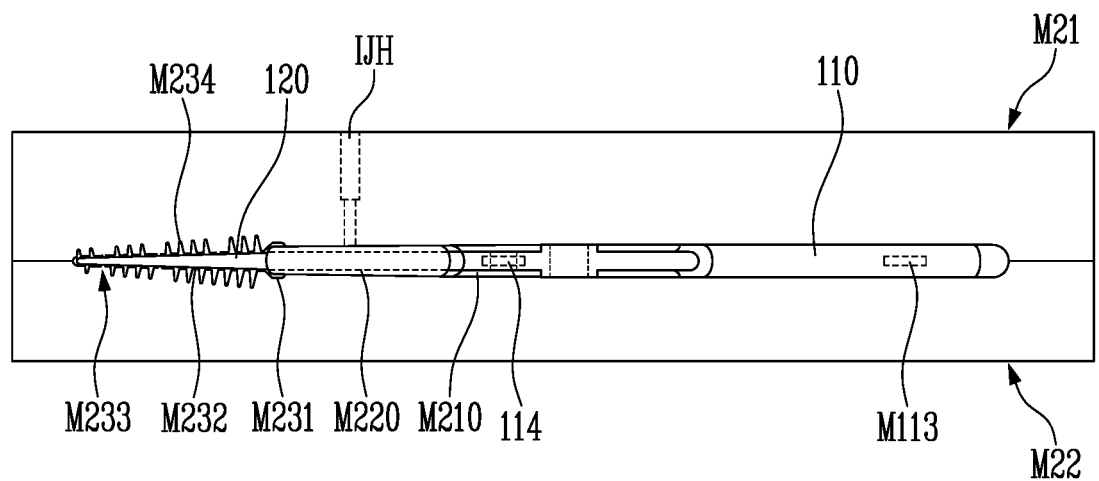
FIG. 10 is a cross-sectional view for illustrating a method of manufacturing the soft part shown in FIG. 1 to FIG. 8.

FIG. 9 is a cross-sectional view for illustrating a method of manufacturing the base part shown in FIG. 1 to FIG. 8, FIG. 10 is a cross-sectional view for illustrating a method of manufacturing the soft part shown in FIG. 1 to FIG. 8, and FIG. 11 is a partially enlarged view for illustrating a projection head molding part. FIG. 9 and FIG. 10 are vertical cross-sectional views parallel to the extension direction of the interdental brush.

First, referring to FIG. 9, a first mold including a first internal space for manufacturing the base part 100 shown in FIG. 1 to FIG. 8 is prepared. The first mold may include a first upper mold M11 and a first lower mold M12, and the first upper mold M11 and the first lower mold M12 may be coupled to form a space of shape corresponding to the based part 100, in other words, a first internal space. For example, the first upper mold M11 and the first lower mold M12 may include a handle molding part M110 and a core molding part M120 corresponding to the handle part 110 and the core part 120 of the base part 100.

The handle molding part M110 may include a first through hole molding part M111, a second through hole molding part M112, a third through hole molding part M113, a first connecting projection molding part M114, and a second connecting projection molding part M115 corresponding to the first through hole 111, the second through hole 112, the third through hole 113, the first connecting projection 114 and the second connecting projection 115 of the base part 100.

The first through hole molding part M111, the second through hole molding part M112, and the third through hole molding part M113 may have a shape in which projections protruding from the first upper mold M11 and the first lower mold M12 contact each other for forming the first through hole 111, the second through hole 112, and the third through hole. A first connecting projection molding part M114 and a second connecting projection molding part M115 may provide a space for forming the first connecting projection 114 and the second connecting projection 115. The region corresponding to the concave part 116 and the groove part 117 of the base part 100 in the handle molding part M110 may have a lower height than other regions.

After preparing the first mold, the base part 100 shown in FIG. 1 to FIG. 8 may be formed by injecting a material forming the base part 100. Here, a first gate (not shown) through which the material is injected into the first mold may be located at the rear end of the handle molding part M110 or at the front end of the core molding part M120.

In addition, the material forming the base part 100 may be a thermoplastic synthetic resin material such as PP, PBT, polyethylene, polyethylene terephthalate, polycyclohexene dimethylene terephthalate, saturated polyester resin, polymethyl methacrylate, cellulose propionate, polyurethane, polyamide, polycarbonate, or acrylonitrile butadiene styrene (ABS).

Figure 11:
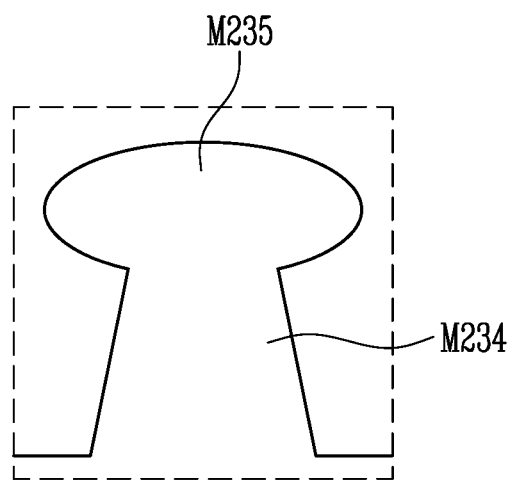
FIG. 11 is a partially enlarged view for illustrating a projection head molding part.

Referring to FIG. 10 and FIG. 11, after the base part 100 is molded, a second mold including a second internal space for manufacturing the soft part 200 may be prepared. The base part 100 may be disposed in the second internal space.

The second mold may include a second upper mold M21 and a second lower mold M22, and the second upper mold M21 and the second lower mold M22 may be coupled to form a space of the shape corresponding to the soft part 200, in other words, a second internal space. For example, the second upper mold M21 and the second lower mold M22 may provide an anti-slip part molding part M210, a connection part molding part M220, and a connection part molding part M230 corresponding to the anti-slip part 210, the connection part 220 and the interdental cleaning part 230 of the soft part 200.

The connection part molding part M230 may provide an insertion preventing part molding part M231 that can form the insertion preventing part 231, the covering part 232, the projection 234 and the projection head 235 of the interdental cleaning part 230, a covering part molding part M232, a projection molding part M234, and a projection head molding part M235. The projection molding part M234 and the projection head molding part M235 may be provided in plurality.

In addition, the connection part molding part M230 may include a through hole molding part M233 corresponding to the through hole 233 of the covering part 232. The through hole molding parts M233 may be provided in plurality. The through hole molding part M233 may be provided in a form in contact with a part of the core part 120 of the base part 100 disposed in the second mold.

In addition, the second mold may include a second gate IJH which is provided in one of the second upper mold M21 and the second lower mold M22 and into which the material forming the soft part 200 is injected.

The second gate IJH may be provided at a position corresponding to the groove part 117 of the base part 100. As the second gate IJH is provided at a position corresponding to the groove part 117 of the base part 100, the material forming the soft part 200 and injected through the second gate IJH may be uniformly supplied to the exterior of the base part 100. In particular, the second gate IJH may be provided at a position where volumes of spaces at both sides of the second gate IJH in which the soft part 200 is formed are substantially the same. Accordingly, the material forming the soft part 200 may be uniformly supplied to both sides of the second gate IJH, and the material forming the soft part 200 may be supplied in the same volume to both sides of the second gate IJH.

Meanwhile, in the present embodiment, the second gate IJH has been described as an example that the second gate IJH is provided at a position corresponding to the groove part 117 of the base part 100, but is not limited thereto. For example, the second gate IJH may be changed to a position where the material included in the soft part 200 may be uniformly supplied to both sides of the second gate IJH.

After preparing the second mold, the soft part 200 illustrated in FIG. 1 to FIG. 8 may be formed by injecting the material forming the soft part 200 through the second gate IJH.

The material forming the soft part 200 may be an elastic material. For example, the material forming the soft part 200 may be a thermoplastic elastic material such as styrene-based, olefin-based, polyamide-based or the like or a thermosetting elastic material such as silicone rubber, urethane rubber, fluoro rubber, natural rubber, synthetic rubber or the like.

Hereinafter, various examples of the interdental brush that the structures of the region corresponding to the interdental brush 10 and the interdental cleaning part 230 shown in FIG. 1 to FIG. 11 are different from each other are described. Hereinafter, differences from the interdental brush 10 shown in FIG. 1 to FIG. 8 will be mainly described, and descriptions of the same component may be omitted.

Figure 12:
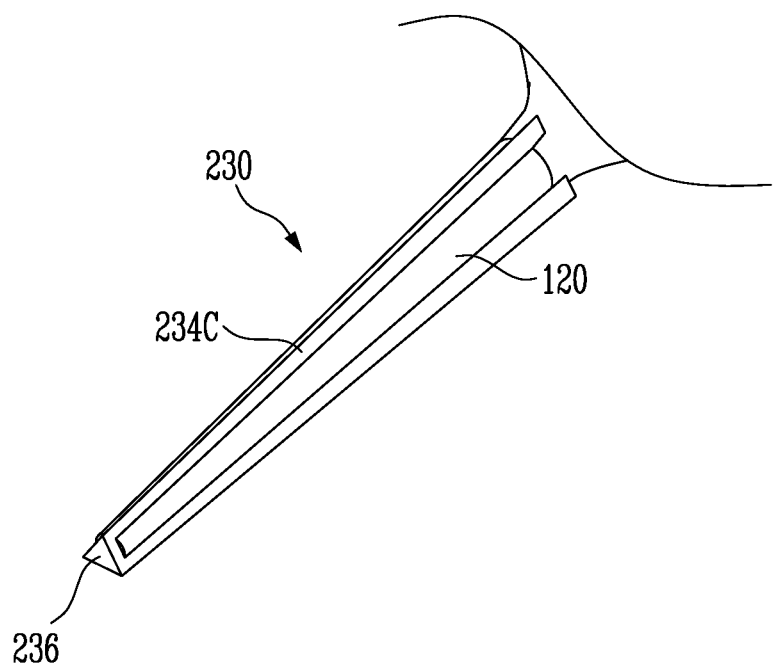
FIG. 12, FIG. 13, FIG. 15 and FIG. 16 are perspective views for illustrating regions corresponding to an interdental cleaning part of an interdental brush in accordance with other embodiments of the present disclosure.
Figure 13:
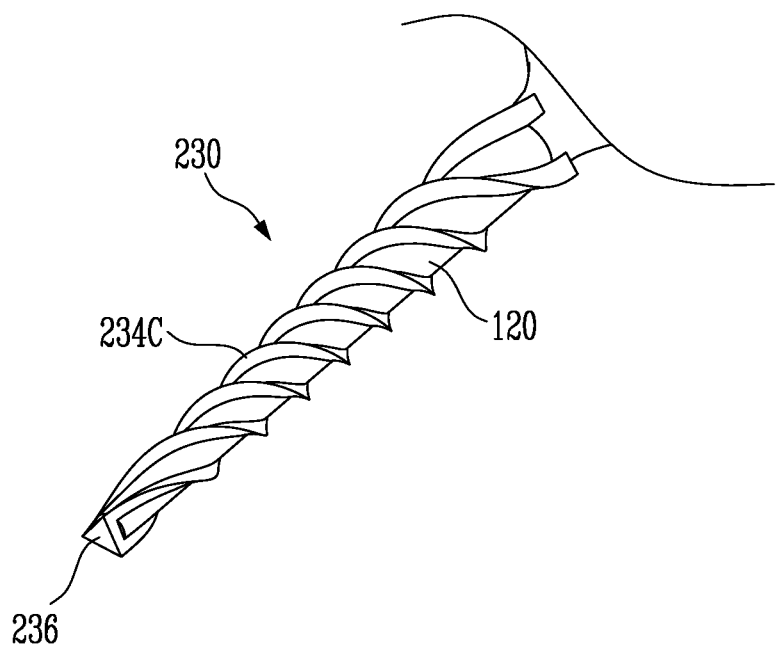
Figure 14:
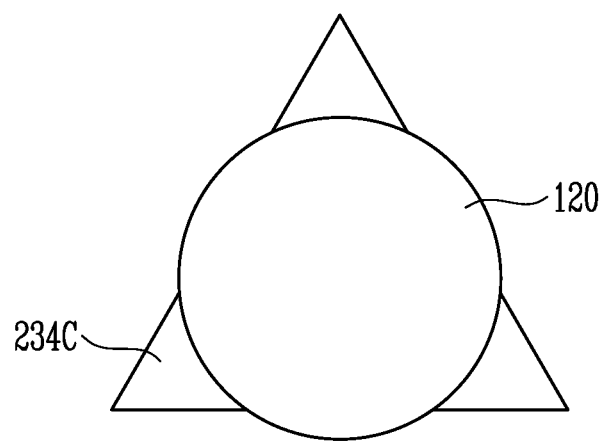
FIG. 14 is a cross-sectional view of the regions corresponding to the interdental cleaning part of the interdental brush shown in FIG. 12 and FIG. 13.
Figure 15:
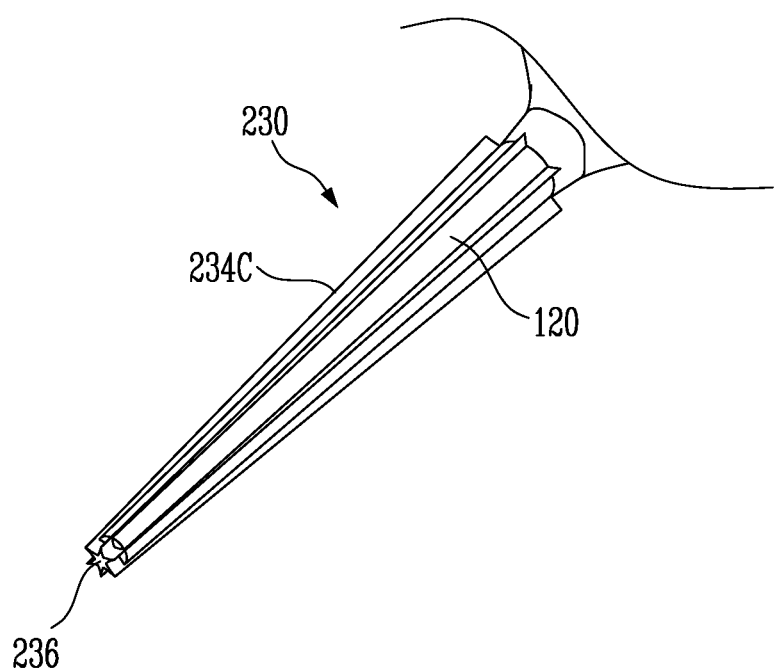
Figure 16:
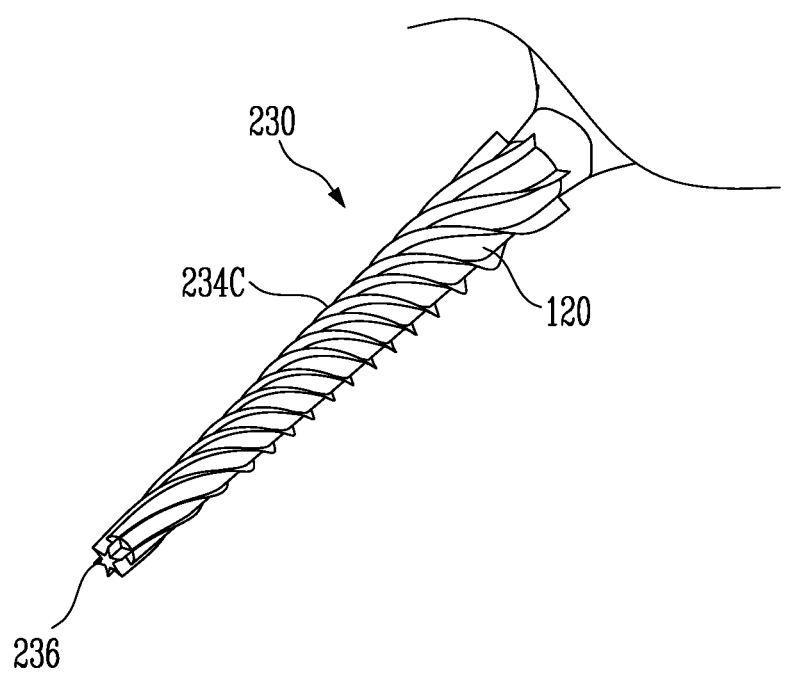
Figure 17:
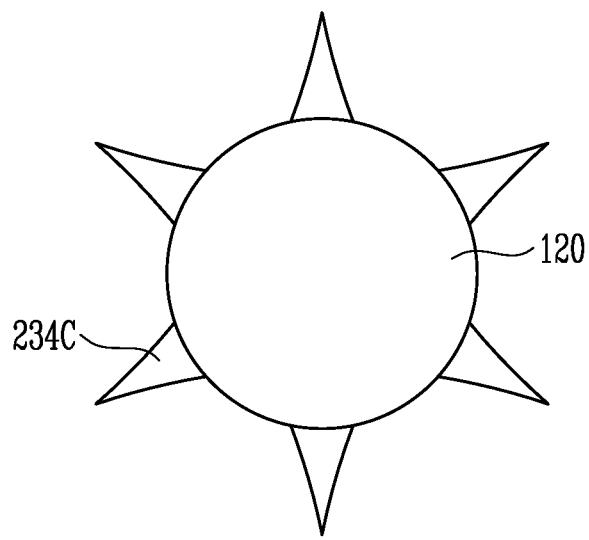
FIG. 17 is a cross-sectional view of the regions corresponding to the interdental cleaning part of the interdental brush shown in FIG. 15 and FIG. 16.

FIG. 12, FIG. 13, FIG. 15 and FIG. 16 are perspective views for illustrating regions corresponding to an interdental cleaning part of an interdental brush in accordance with other embodiments of the present disclosure, FIG. 14 is a cross-sectional view of a region corresponding to the interdental cleaning part of the interdental brush shown in FIG. 12 and FIG. 13, and FIG. 17 is a cross-sectional view of the region corresponding to the interdental cleaning part of the interdental brush shown in FIG. 15 and FIG. 16.

Referring to FIG. 12 to FIG. 17, the interdental brush 10 may include the base part 100 and the soft part 200.

The base part 100 may include the handle part 110 and the core part 120.

The core part 120 may extend from the handle part 110 and may be formed in a substantially linear and elongated shaft shape.

The soft part 200 may be formed of an elastic material. The soft part 200 may extend from a part of the base part 100 and include the interdental cleaning part 230 provided in correspondence with the core part 120.

The interdental cleaning part 230 may clean the user's interdental space. The interdental cleaning part 230 may include a plurality of continuous projections 234C and a projection connection part 236.

As shown in FIG. 12 and FIG. 15, the plurality of continuous projections 234C may extend parallel to the extension direction of the core part 120 on the outer circumferential surface of the core part 120, and may be provided to be spaced apart from each other. However, the interdental brush 10 shown in FIG. 15 may include more continuous projections 234C than the interdental brush 10 shown in FIG. 12.

In addition, as shown in FIG. 13 and FIG. 16, the plurality of continuous projections 234C may be provided to be spaced apart from each other, and may have a spiral shape surrounding the outer circumferential surface of the core part 120 a plurality of times. However, the interdental brush 10 shown in FIG. 16 may include more continuous projections 234C than the interdental brush 10 shown in FIG. 13.

The projection connection part 236 may be provided at the end of the interdental cleaning part 230 to connect the plurality of continuous projections 234C.

Meanwhile, since the plurality of continuous projections 234C are provided to be spaced apart from each other, a part of the core part 120 may be exposed. The exposed surface of the core part 120 may have high surface roughness or may be provided with fine projections. The surface of the core part 120 having the high surface roughness or provided with fine projections may increase frictional force. Therefore, when cleaning the interdental space, the foreign substances between the teeth may be effectively removed.

Figure 18:
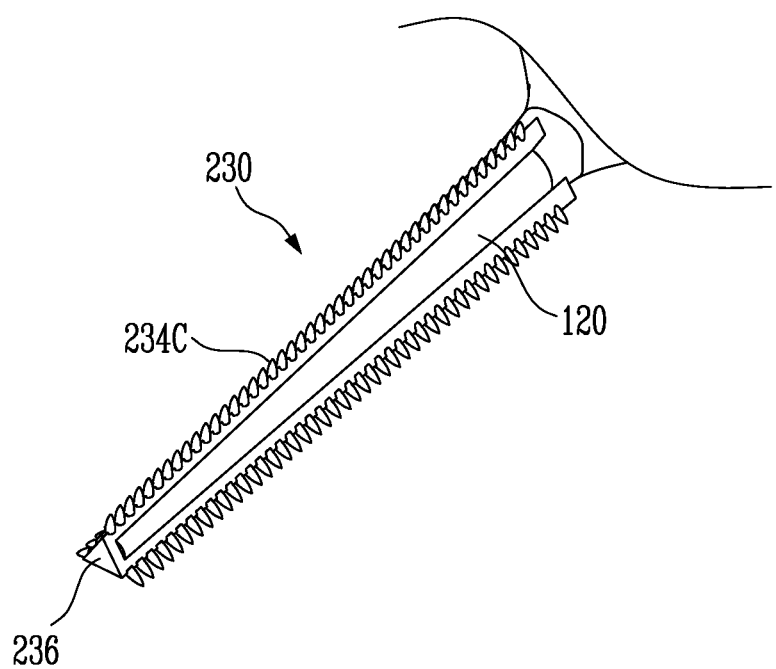
FIG. 18, FIG. 19, FIG. 21 and FIG. 22 are perspective views for illustrating regions corresponding to an interdental cleaning part of an interdental brush in accordance with other embodiments of the present disclosure.
Figure 19:
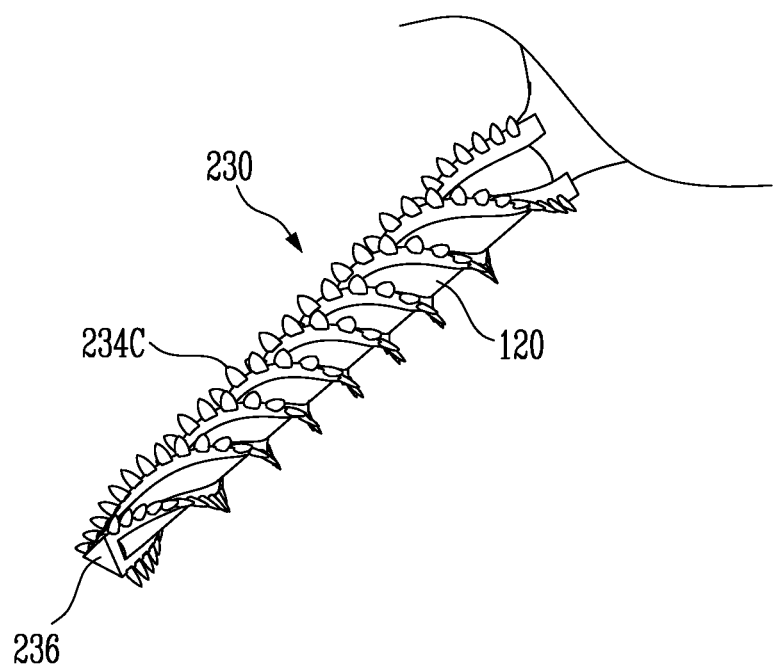
Figure 20:
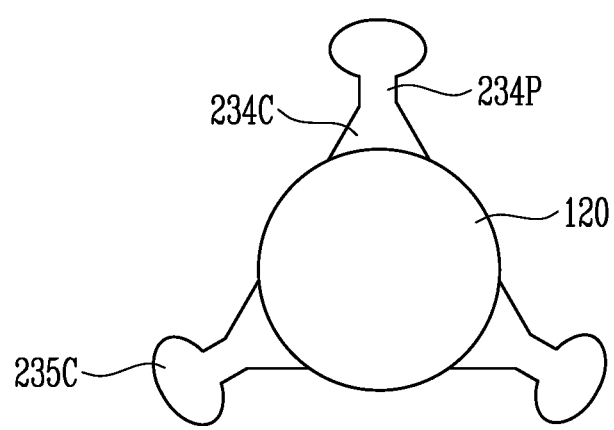
FIG. 20 is a cross-sectional view of the regions corresponding to the interdental cleaning part of the interdental brush shown in FIG. 18 and FIG. 19.
Figure 21:
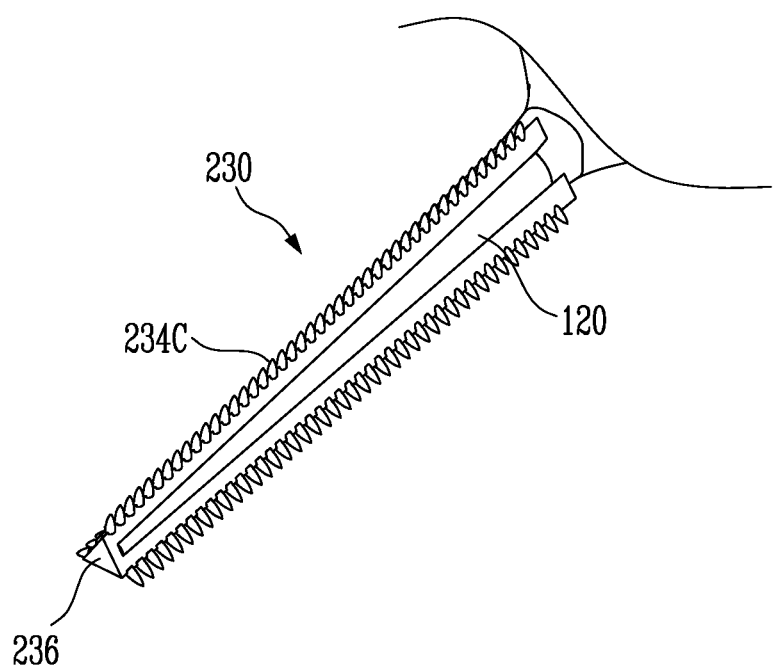
Figure 22:
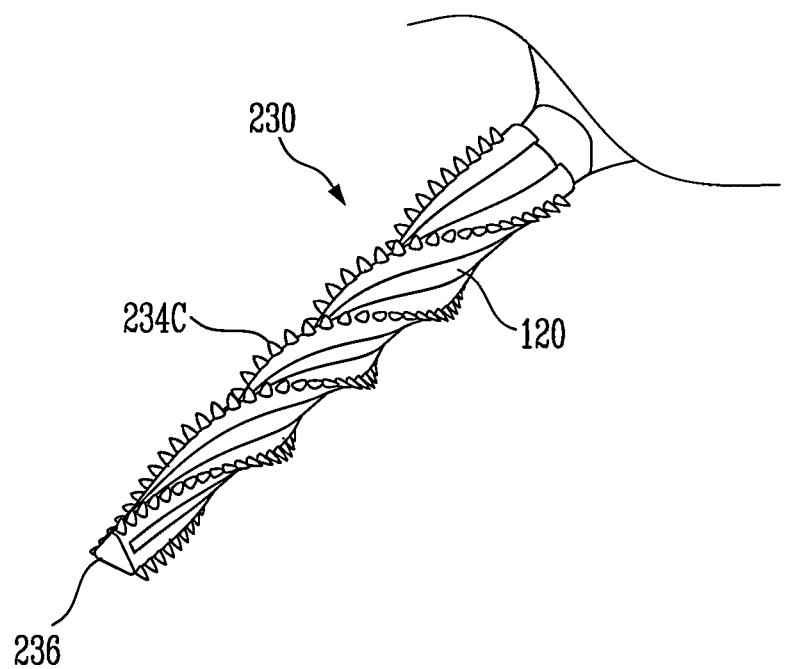
Figure 23:
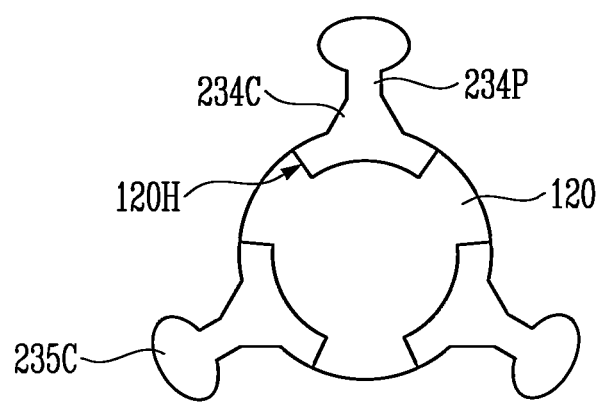
FIG. 23 is a cross-sectional view of the regions corresponding to the interdental cleaning part of the interdental brush shown in FIG. 21 and FIG. 22.

FIG. 18, FIG. 19, FIG. 21 and FIG. 22 are perspective views for illustrating a region corresponding to the interdental cleaning part of the interdental brush according to another embodiment of the present disclosure, FIG. 20 is a cross-sectional view of a region corresponding to the interdental cleaning part of the interdental brush shown in FIG. 18 and FIG. 19, and FIG. 23 is a cross-sectional view of a region corresponding to the interdental cleaning part of the interdental brush shown in FIG. 21 and FIG. 22.

Referring to FIG. 18 to FIG. 23, the interdental brush 10 may include the base part 100 and the soft part 200.

The base part 100 may include the handle part 110 and the core part 120.

The core part 120 may extend from the handle part 110 and may be formed in a substantially linear and elongated shaft shape.

The soft part 200 may extend from a part of the base part 100 and may include the interdental cleaning part 230 provided in correspondence with the core part 120.

The interdental cleaning part 230 may include the plurality of continuous projections 234C and a projection connection part 236.

As shown in FIG. 18 and FIG. 21, the plurality of continuous projections 234C may extend parallel to the extension direction of the core part 120 on the outer circumferential surface of the core part 120 and may be provided to be spaced apart from each other. However, the interdental brush 10 shown in FIG. 21 may include more continuous projections 234C than the interdental brush 10 shown in FIG. 18.

A plurality of protrusions 234P spaced apart from each other may be provided on the plurality of continuous projections 234C, and a projection head 235C may be provided on each protrusion 234P. The protrusion 234P and the projection head 235C may more effectively remove foreign substances between the teeth.

As shown in FIG. 19 and FIG. 22, the plurality of continuous projections 234C may be provided to be spaced apart from each other and may have a spiral shape surrounding the outer circumferential surface of the core part 120 a plurality of times. However, the interdental brush 10 shown in FIG. 22 may include more continuous projections 234C than the interdental brush 10 shown in FIG. 19.

The projection connection part 236 may be provided at the end of the interdental cleaning part 230 to connect the plurality of continuous projections 234C.

Meanwhile, as shown in FIG. 23, a part of the continuous projection 234C may be provided in the core part 120, and may be provided in a groove extension part 120H connected to the groove part 117. When a part of the continuous projection 234C is provided in the groove extension part 120H, the bonding force between the base part 100 and the soft part 200 may be strengthened.

In addition, the surface of the core part 120 exposed between the plurality of continuous projections 234C may have high surface roughness or may be provided with fine projections. The surface of the core part 120 having the high surface roughness or provided with fine projections may increase frictional force. Therefore, when cleaning the interdental space, it is possible to effectively remove the foreign substances between the teeth.

Figure 24:
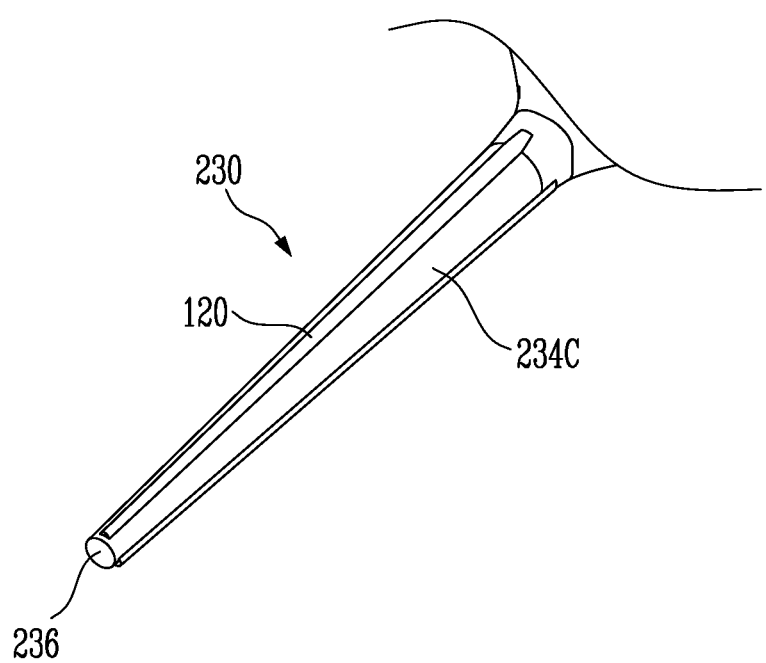
FIG. 24, FIG. 25, FIG. 27 and FIG. 28 are perspective views for illustrating regions corresponding to an interdental cleaning part of an interdental brush in accordance with other embodiments of the present disclosure.
Figure 25:
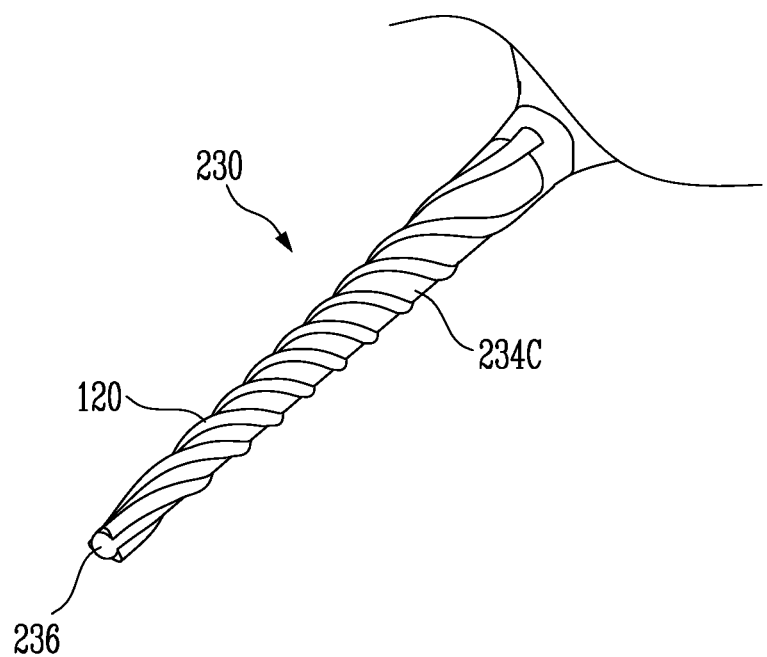
Figure 26:
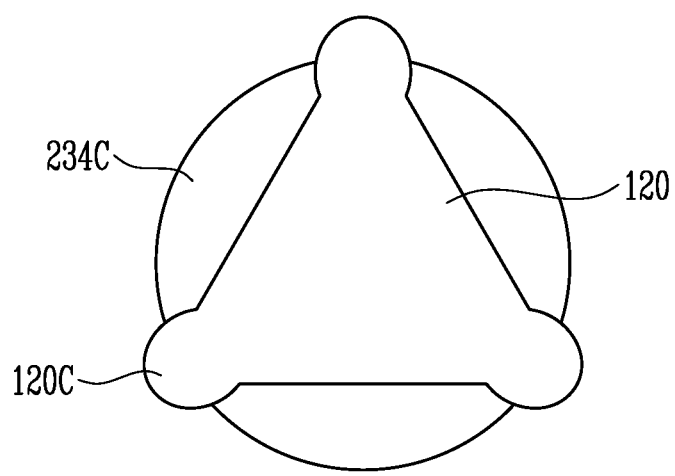
FIG. 26 is a cross-sectional view of the regions corresponding to the interdental cleaning part of the interdental brush shown in FIG. 24 and FIG. 25.
Figure 27:
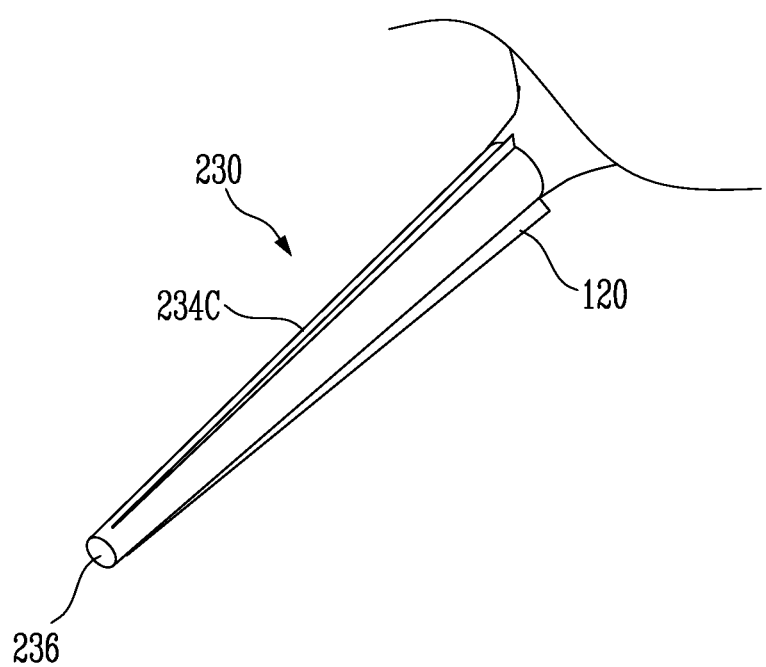
Figure 28:
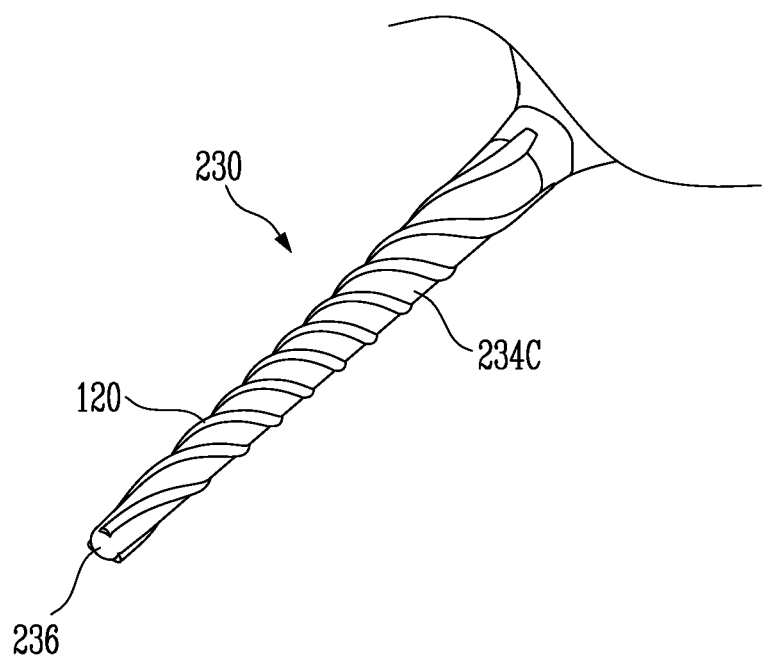
Figure 29:
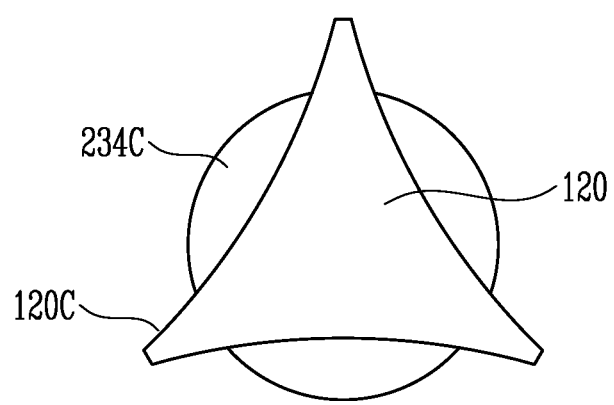
FIG. 29 is a cross-sectional view of the regions corresponding to the interdental cleaning part of the interdental brush shown in FIG. 27 and FIG. 28.

FIG. 24, FIG. 25, FIG. 27 and FIG. 28 are perspective views for illustrating regions corresponding to an interdental cleaning part of an interdental brush in accordance with other embodiments of the present disclosure, FIG. 26 is a cross-sectional view of the region corresponding to the interdental cleaning part of the interdental brush shown in FIG. 24 and FIG. 25, and FIG. 29 is a cross-sectional view of the region corresponding to the interdental cleaning part of the interdental brush shown in FIG. 27 and FIG. 28.

Referring to FIG. 24 to FIG. 29, the interdental brush 10 may include the base part 100 and the soft part 200.

The base part 100 may include the handle part 110 and the core part 120.

The core part 120 may extend from the handle part 110 and may be formed in a substantially linear and elongated shaft shape.

The cross-section of the core part 120 may have a triangular shape as a whole. For example, as shown in FIG. 26, the cross section of the core part 120 may be triangular, and a core projection 120C may be provided at each corner part of the triangle. The core projection 120C may more effectively remove foreign substances between the teeth.

In addition, as shown in FIG. 29, the cross section of the core part 120 may have a shape in which each side of the triangle is curved toward the center of the core part 120, and the corner part of the triangle may have a shape of protruding to the outside of the interdental cleaning part 230. Accordingly, in the cross-section of the core part 120, the triangular corner part may serve as the core projection 120C. As shown in FIG. 29, the core part 120 having a cross-sectional shape in which each side of the triangle is curved inward of the triangle may have high bending resistance.

The soft part 200 may be provided in the form of a covering extending from a part of the base part 100 to surround the core part 120. Also, the soft part 200 may include the interdental cleaning part 230 provided in correspondence with the core part 120. Here, the cross-section of the core part 120 and the continuous projection 234C may be circular.

The interdental cleaning part 230 may expose a part of the core part 120, for example, the core projection 120C. In other words, the core projection 120C may have a circular shape protruding to the outside and formed by the core part 120 and the continuous projection 234C.

As shown in FIG. 24 and FIG. 27, the core projections 120C may extend parallel to the extension direction of the core part 120 and may be provided to be spaced apart from each other. However, the exposed area of the core projection 120C shown in FIG. 24 may be smaller than the exposed area of the core projection 120C shown in FIG. 27.

In addition, as shown in FIG. 25 and FIG. 28, the core projections 120C may be provided to be spaced apart from each other and may have a spiral shape surrounding the outer circumferential surface of the core part 120 a plurality of times.

The surface of the core projection 120C may have a high surface roughness. The surface of the core projection 120C having the high surface roughness may increase a friction force. Therefore, when cleaning the interdental space, the foreign substances between the teeth may be effectively removed.

The present disclosure is not limited to the embodiments described above, and combinations of at least two or more of the above embodiments or combinations of at least any one of the above embodiments and known arts may be included as new embodiments.

While the present disclosure has been described in detail with reference to specific exemplary embodiments, the exemplary embodiments are intended to explain the present disclosure specifically, and the present disclosure is not limited thereto. It will be apparent that modifications or improvements are possible by those skilled in the art within the technical spirit of the present disclosure.

All simple modifications or changes of the present disclosure are within the scope of the present disclosure, and the specific protection scope of the present disclosure will be clear by the appended claims.

[Explanation of Symbols]

| | |
|---|---|
| 10: Interdental brush | 100: Base part |
| 110: Handle part | 120: Core part |
| 200: Soft part | 210: Anti-slip part |
| 220: Connection part | 230: Interdental cleaning part |
| M11: First upper mold | M12: First lower mold |
| M21: Second upper mold | M22: Second lower mold |

What is claimed is:

1. An interdental brush comprising:
   a base part comprising:
      a handle part that is grippable by a user;
      a core part extending from the handle part that has a diameter or thickness that decreases as a distance from the handle part increases;
      a first through hole;
      a second through hole spaced apart from the first through hole in a longitudinal direction; and
      a concave part between a lower end of the handle part and the core part, having a shape extending to a periphery of the first through hole, and having a smaller thickness than other regions; and
   a soft part comprising an anti-slip part covering at least a part of the handle part, and an interdental cleaning part covering the core part and comprising a plurality of projections for removing foreign substances between teeth, the soft part being formed of an elastic material,
   wherein the soft part is coupled to a space formed by at least one of the first through hole and the second through hole, and
   wherein the first through hole and the second through hole are opened in a vertical direction, and the concave part includes a surface exposed in a side direction different from the vertical direction and the longitudinal direction such that a groove is not formed.

2. The interdental brush of claim 1,
   wherein the second through hole is disposed between the core part and the first through hole, and
   wherein the first through hole is larger than the second through hole.

3. The interdental brush of claim 2, wherein a width of the first through hole is 35% to 90% of a width of the handle part corresponding to the first through hole in a direction perpendicular to a longitudinal direction of the handle part.

4. The interdental brush of claim 2, wherein the soft part is coupled to a space formed by the second through hole.

5. The interdental brush of claim 2, wherein the base part further comprises:
   a groove part connected to an upper end of the concave part and having a shape extending to the core part; and
   a third through hole provided in a part of the groove part,
   wherein the anti-slip part is provided corresponding to the concave part, and
   wherein the interdental cleaning part is provided in a form to surround the core part in correspondence with the core part.

6. The interdental brush of claim 5, wherein the soft part further comprises a connection part provided corresponding to the groove part and configured to connect the anti-slip part and the interdental cleaning part, and wherein the connection part is coupled to the third through hole.

7. The interdental brush of claim 5, wherein the interdental cleaning part further comprises a plurality of continuous projections provided to be spaced apart from each other on an outer circumferential surface of the core part and extending parallel to an extension direction of the core part, wherein the plurality of continuous projections extend parallel to the extension direction of the core part, or have a spiral shape or linear surrounding the outer circumferential surface of the core part, and wherein the plurality of continuous projections comprises:

a plurality of protrusions provided on the plurality of continuous projections to be spaced apart from each other; and projection heads provided on the plurality of protrusions, wherein the core part comprises a groove extension part connected to the groove part, and wherein a part of the plurality of the continuous projections is provided in the groove extension part.

8. The interdental brush of claim 7, wherein a surface of the core part exposed between the plurality of continuous projections has a high surface roughness or further comprises fine projections.

9. The interdental brush of claim 7, wherein a cross-section of the core part has a triangular shape, and a core projection is provided at a corner part of the triangular shape, wherein the core projection has a shape of protruding to outside of a circle formed by the core part and the plurality of continuous projections, wherein the core projection and the plurality of continuous projections have the spiral shape of surrounding the outer circumferential surface of the core part, and wherein the core part has a shape in which each side of the triangle shape is curved toward a center of the core part.

10. The interdental brush of claim 7, wherein the interdental cleaning part further comprises a projection connection part provided at an end of the interdental cleaning part to connect the plurality of continuous projections.

11. The interdental brush of claim 2, wherein the anti-slip part is provided on a surface of a region corresponding to the second through hole, and comprises a plurality of protruding projections extending in a direction parallel to an extension direction of the handle part.

12. The interdental brush of claim 1, further comprising a third through hole opened in the vertical direction, and wherein the second through hole is located in between the first through hole and the third through hole with respect to the longitudinal direction.

13. The interdental brush of claim 12, wherein a cross-section area of the first through hole is greater than a cross-section area of the second through hole, and wherein the cross-section area of the second through hole is greater than a cross-section area of the third through hole.

14. The interdental brush of claim 1, wherein the second through hole is located in between connecting projections.

* * * * *